(12) United States Patent
Karabatsos

(10) Patent No.: US 6,854,042 B1
(45) Date of Patent: Feb. 8, 2005

(54) HIGH-SPEED DATA-RATE CONVERTING AND SWITCHING CIRCUIT

(76) Inventor: Chris Karabatsos, 42 Jumping Brook La., Kingston, NY (US) 12401

( * ) Notice: Subject to any disclaimer, the term of this patent is extended or adjusted under 35 U.S.C. 154(b) by 0 days.

(21) Appl. No.: 10/604,455

(22) Filed: Jul. 22, 2003

Related U.S. Application Data

(60) Provisional application No. 60/397,491, filed on Jul. 22, 2002.

(51) Int. Cl.[7] .............................................. G06F 12/00
(52) U.S. Cl. ...................... 711/167; 711/5; 365/230.03; 365/233
(58) Field of Search ........................... 711/5, 105, 167; 713/501; 365/193, 233, 230.03

(56) References Cited

U.S. PATENT DOCUMENTS 5,666,322 A  *  9/1997  Conkle ........................ 365/233

6,526,473 B1  *  2/2003  Kim ............................ 711/105

* cited by examiner

Primary Examiner—Pierre M. Vital
(74) Attorney, Agent, or Firm—Mark P. White

(57) ABSTRACT

A high speed bidirectional data rate conversion circuit converts 1× data rate signals from attached devices on port A and port B to 2× data rate signals on bus C and further converts 2× high speed data rate signals on bus C to 1× data rate signals on ports A and B for memory devices attached to ports A and B. The usage of pass gate switches and combination of latches and counters is used to permit proper synchronization of the data signals, and to further generate strobe signals at both system bus and memory bus sides, and to further generate data mask signals for writing to the memory bus side of the circuit. The collection of such switching elements and latches are provided on a single silicon chip which includes of the functions of the invention.

16 Claims, 8 Drawing Sheets

Figure 2

FUNCTION TABLE

DISABLED DIMM

| INPUT | | | INPUT / OUTPUT | | | | | Internal Latch Outputs | | OUTPUT | | | | Operating Mode |
|---|---|---|---|---|---|---|---|---|---|---|---|---|---|---|
| ME # | W/R | BE CLK | C[n] | B[n] | A[n] | DQS CA | DQSCB DM | Q10[n] (A) | Q9[n] (B) | DMA | DMB | DQSA DQSA1 | DQSB DQSB1 | |
| 1 | X | X | Hi-Z | Hi-Z | Hi-Z | Hi-Z | Hi-Z | No change | No change | No change | No change | Hi-Z | Hi-Z | Disable DIMM |

READ CYCLES

| INPUT | | | | | Internal Latch Outputs | | OUTPUT | | | | | | Operating Mode |
|---|---|---|---|---|---|---|---|---|---|---|---|---|---|
| ME # | W/R | BE CLK | B[n] | A[n] | Q10[n] (A) | Q9[n] (B) | C[n] | DQS CA | DQSCB DM | DMA | DMB | DQSA DQSA1 | DQSB DQSB1 | |
| 0 | 1 | ↓ / 0 | Input | Input | A[n] / No change | No change / No change | Q10(A) | PU | PD | Don't Care | Don't Care | Hi-Z | Hi-Z | C Read A |
| 0 | 1 | ↑ / 1 | Input | Input | No change / No change | B[n] / No change | Q9 (B) | PD | PU | Don't Care | Don't Care | Hi-Z | Hi-Z | C Read B |

WRITE CYCLES (DQ and DM lines)

| INPUT | | | | | | Internal Latch Outputs | | | | OUTPUT | | | | Operating Mode |
|---|---|---|---|---|---|---|---|---|---|---|---|---|---|---|
| ME # | W/R | BE CLK | DQS CA | DQSCB DM | C[n] | Q10[n] (A) | Q9[n] (B) | Q19(A) | Q20(B) | A[n] | B[n] | DMA | DMB | |
| 0 | 0 | X | ↑ | Input | Input | C[n] | No change | DM | No change | Q19 (A) | Q9 (B) | Q19(A) | Q20(B) | C Write Q10(A) Send DQSB |
| 0 | 0 | X | ↓ | Input | Input | No change | C[n] | No change | DM | Q19 (A) | Q9 (B) | Q19(A) | Q20(B) | C Write Q9(B) Send DQSA |

WRITE CYCLES (DQS Counter)

| INPUT | | | | Internal Latch Outputs | | OUTPUT | | Operating Mode |
|---|---|---|---|---|---|---|---|---|
| ME # | W/R | BE CLK | DQS CA | Q26(A) | Q27(B) | DQSA DQSA1 | DQSB DQSB1 | |
| 1 | X | X | X | 0 | 0 | Hi-Z | Hi-Z | Disable DIMM (DQS latch reset) |
| 0 | 1 | X | X | 0 | 0 | Hi-Z | Hi-Z | Read Cycle (DQS latch reset) |
| 0 | 0 | X | First ↑ | No change | No change | Q26(A) | Q27(B) | C Write DQ (1st Write Cycle) |
| 0 | 0 | X | ↑ (All subsequent) | No change | Toggle | Q26(A) | Q27(B) | C Write DQ Send DQSB |
| 0 | 0 | X | ↓ | Toggle | No change | Q26(A) | Q27(B) | C Write DQ Send DQSA |

# HIGH-SPEED DATA-RATE CONVERTING AND SWITCHING CIRCUIT

BACKGROUND OF INVENTION

This application claims priority based on provisional patent No. 60/397,491 filed on Jul. 22, 2002 by the applicant of the present invention.

The computer industry, with the advances of silicon technology, is constantly faced with the complexities of high speed Data Buses. The high speed of microprocessor CPU requires high speed of data bus between the memory sub-system and the front end CPU data bus. However, speed without density of memory is an unbalanced combination. Modern computer systems require increasingly large RAM arrays, and these arrays are packaged in modules of approximately the same size as used in previous, lower capacity memories. Thus, the density of the memory modules, in bits or bytes per square inch of circuit board, is constantly increasing.

The CPU by itself cannot increase computer performance without a high speed memory sub-system and it does not perform at the speed it was designed for. When memory access is substantially slower than CPU speed a bottleneck is created between memory and CPU Front End bus. With advances of the Internet, complex application programs and operating systems, memory sub-systems with high-density memory modules have become a necessity.

However, as the density of memory goes up, the capacitive loading of each data bit of the Data Bus increases. With the increase of the capacitive loading on the Data Bus, the driver of the data bit line is taxed for higher driving capability. As is well known, when the capacitive loading on a data line increases, the speed at which the corresponding driver circuit can change state on the data line decreases. Thus, on a given data line, the capacitive loading and the speed of data transfer are inversely proportional.

Many bus schemes have been designed to maximize speed in memory modules having increasing memory density. For that purpose, circuits utilizing pass gate switches have been designed into the data path to isolate and reduce the capacitive loading.

There are several factors to be considered in the design of such Bus circuits: 1) Data pulse widths in the nanosecond and sub nanosecond range limited by high frequency data rates.

2) Data bus width to satisfy wide Data Bus requirements of the CPU.

3) High Memory density on the same Data Bus (More Memory Modules attached to the same Data Bus, more connectors on the motherboard attached to the Bus.) 4) Presence of physical parameters of Resistance, Inductance and Capacitance (RLC) in the structure of the Data Bus and on the devices (Connectors, Memory modules, Printed circuit boards, Memory chips and logic chips connected to the Bus).

5) Effects of the physical RLC quantities affecting the overall speed by which data can be transported on the Bus and thus the overall performance and bandwidth of such Bus.

6) Synchronization of the Data signals and Strobe signals required to latch the data at the destination receiver.

Solutions to these problems in the prior art implemented systems having dual data banks, in which the data rate at each data bank is one-half the data rate at the system bus. However, further increases in computer speed have created synchronization problems in the reading and writing of data between the system bus and the memory banks.

The present invention presents a radical improvement over the prior art by generating strobe signals and data signals which are synchonized with each other at both the computer bus, which operates at twice the basic computer clock frequency where two data banks are used, and at the memory banks, which operate at the basis computer clock frequency.

Unlike the prior art, the present invention allows the Bus of data rate 2× frequency to be connected to device interface of 1× data rate frequency and vice versa.

The present invention provides a significant improvement in memory data rate speed and accuracy with substantial improvement in synchronization between the strobes and data in either direction of transmission and reception and better quality of signal over the prior art.

SUMMARY OF INVENTION

It is an object of the current invention to provide a circuit to act as a switching interface between memory banks A and B and the data bus C of a computer memory subsystem. It is a specific object to provide such a circuit implemented in accordance with memory subsystem architecture which conforms with JEDEC specifications. It is a further specific object that said chip is implemented in accordance with quad-speed memory architecture which conforms with JEDEC specifications. It is a final specific object of the current invention to provide such a circuit in the form of a microelectronic chip.

In accordance with one aspect of the current invention a high speed data rate converting and switching circuit for use in computer memory systems having an A bank and a B bank, and further having a basic system clock frequency includes a data MUX and latch subsystem which transfers each of a multiplicity of system bus data signals having twice the basic clock frequency to a memory bank data signal having the basic clock frequency during a write operation.

In accordance with a second aspect of the invention, the high speed data rate converting and switching transfers each of a multiplicity of memory bank data signals having the basic clock frequency to a system data bus data signal having twice the basic clock frequency during a read operation.

In accordance with a third aspect of the invention a strobe MUX and latch subsystem is included which generates a memory bank strobe signal having the basic clock frequency, and which is synchronized to the memory bank data signals during the write operation, and which generates a system bus strobe signal having twice the basic clock frequency which is synchronized to the system bus data signals during the read operation.

In accordance with a fourth aspect of the invention a mask MUX and latch subsystem is included which generates a memory bank mask signal having the basic clock frequency, and synchronized to the memory bank data signals during the write operation.

In accordance with a fifth aspect of the invention a multiplicity of first latching circuits are included which increase the duration of each data bit during both a read and a write operation.

In accordance with a sixth aspect of the invention means to generate an internal clock signal at twice the frequency of the basic system clock frequency is included.

In accordance with a seventh aspect of the invention means to AND the internal clock signal with the output of each first latching circuit are included.

In accordance with a seventh aspect of the invention the system bus data signal is synchronized with the basic system clock.

In accordance with an eighth aspect of the invention means are included to AND the basic system clock signal with the output of each first latching circuit, so that the memory data bank signal is synchronized with the basic system clock.

In accordance with a ninth aspect of the present invention the means to generate an internal clock signal at twice the frequency of the basic system clock frequency further includes a two-bit counter.

In accordance with a tenth aspect of the present invention a high speed data rate converting and switching circuit for use in computer memory systems containing banks A1 through Am, where m is an integer greater than 2, and which also includes a basic system clock frequency contains a data MUX and latch subsystem which transfers each of a multiplicity of system bus data signals having twice the basic clock frequency to a memory bank data signal having the basic clock frequency during a write operation, and which transfers each of a multiplicity of memory bank data signals having the basic clock frequency to a memory data bus data signal having m times the basic clock frequency during a read operation.

In accordance with an eleventh aspect of the current invention the means to generate an internal clock signal at m times the frequency of the basic system clock frequency includes an m-bit counter.

In accordance with a twelfth aspect of the invention, a process for reading and writing data in computer memory systems having an A bank and a B bank, and further including a basic system clock frequency includes transferring each of a multiplicity of system bus data signals having twice the basic clock frequency to a memory bank data signal having the basic clock frequency during a write operation, and transferring each of a multiplicity of memory bank data signals having the basic clock frequency to a memory data bus data signal having twice the basic clock frequency during a read operation.

In accordance with a thirteenth aspect of the current invention, the process further includes generating a memory bank strobe signal having the basic clock frequency which is synchronized to the memory bank data signals during the write operation, and generating a system bus strobe signal having twice the basic clock frequency which is synchronized to the system bus data signals during the read operation.

In accordance with a thirteenth aspect of the current invention, the process further includes generating a memory bank mask signal having the basic clock frequency which is synchronized to the memory bank data signals during the write operation.

In accordance with a fifteenth aspect of the present invention, the process includes latching the system data bus signals and the memory bank data signals to increase the duration of each data bit during both a read and a write operation; In accordance with a sixteen aspect of the present invention, the process includes generating an internal clock signal at twice the frequency of the basic system clock frequency.

In accordance with a seventeenth aspect of the present invention, the process includes ANDing the internal clock signal with the output of each first latching circuit.

In accordance with an eighteenth aspect of the current invention the process provides that the system bus data signal is synchronized with the basic system clock.

In accordance with a nineteenth aspect of the current invention a first external clock provides a first frequency signal, and a second external clock provides a second frequency signal.

In accordance with a twentieth aspect of the current invention means are provided for generating system strobe signals by ANDing a pull-up signal with the internal clock, and by ANDing a pull-down signal with the internal clock during the read operation.

In accordance with a twenty-first aspect of the present invention the internal clock generation circuit further provides a circuit which is triggered by the falling edge of the second external clock.

In accordance with a twenty-second aspect of the current invention means are provided to output data to the memory banks by latching the latching circuits by the rising and falling edges of the second external clock during a write operation.

In accordance with a final aspect of the current invention, means are provided to produce a system bus strobe signal triggered by the rising edge of the second external clock during a write operation.

BRIEF DESCRIPTION OF DRAWINGS

These, and further features of the invention, may be better understood with reference to the accompanying specification and drawings depicting the preferred embodiment, in which:

FIG. 2 depicts a logic table of the functions of the present invention.

DETAILED DESCRIPTION

Figure 1:
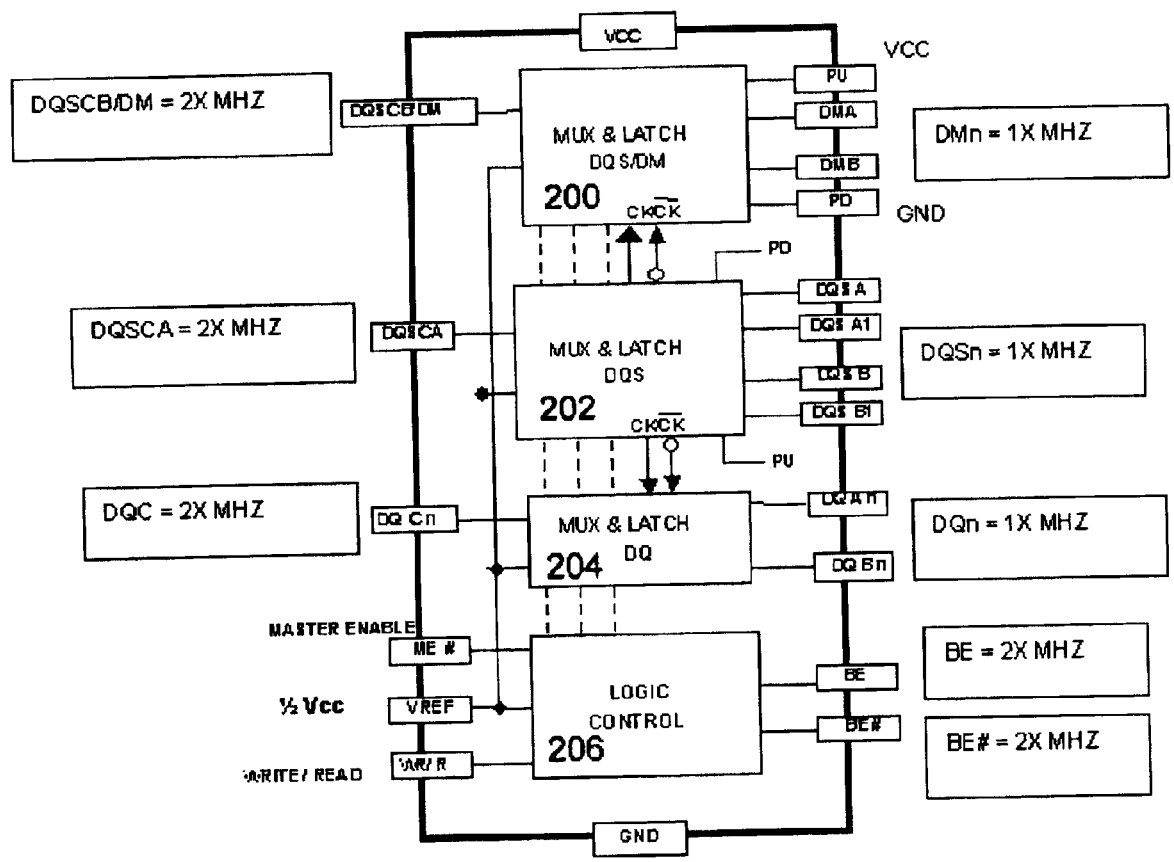
FIG. 1 depicts a block diagram of the present invention.

15DETAILED DESCRIPTIONThe current invention is a high speed Data Rate Converting and Switching Circuit for use in high speed memory systems in modern computers. The present invention is used in conjunction with a high-speed computer memory system, such as that disclosed in U.S. Pat. No. 6,446,158, issued on Sep. 3, 2002 to Chris Karabatsos, the inventor of the current invention. Said prior application Ser. No. 6,446,158 is incorporated herein by reference, in its entirety, for the purpose of describing the application and utility of the present invention, and for describing further the interface between the present invention and external devices not part of the present invention.

SIGNAL DEFINITIONS In the following description, the signals will be identified as follows. Unless otherwise indicated, the identities of the signals and the ports on which the signals appear are used interchangeably.

ME (Master Enable) The ME signal has as primary function to enable or disable the device so that the 2× side will be connected to or isolated from the 1× side by the logic within the apparatus of the current invention, acting together with the BE and W/R input signals. Further more, a FALSE state (High level) of the ME signal also produces a RESET function for the internal latches of the device and blocks any influence of the BE signal to the functions it controls. The RESET state of the device sets some internal latches to a known and desired state.

The ME signal must be in its TRUE state (low level) to enable the device to function in the Read and Write mode.

[1] BE and BE# (Bank Enable)—The BE and BE# signals constitute a differential input pair of complementary signals. When these signals are crossing going in opposite level direction, they generate internal signals which control the PASS gate switches that connect alternately the latched data (DQ) of the connected devices on ports A and B to the corresponding (DQ) data on port C. These control signals also clock the DQ latches during a read operation depicted in FIG. 3.

[2] W/R (Write, Read) This signal commands either a READ or a WRITE function to the memory banks. The TRUE state (low level) of this signal enables all the states required to implement a Write function. The FALSE state (High level) of this signal enables the states for a Read function. These functions are further explained below during the descriptions of the circuitry in FIG. 3.

[3] PULL UP (PU) and PULL DOWN (PD)The PU and PD inputs to the device are used to emulate a driver and to generate the DQSCA and DQSCB signals during a Read operation. PU is permanently at Vcc with or without a series resistor, or TRUE state, and PD is permanently GND with or without a series resistor, or FALSE state. Connecting either the PU or PD input to the C side under control of the BE signal results in the generation of the DQSCA and DQSCB signals during a Read operation. The sequence of connections of the PU and PD to the C side for DQSCA and DQSCB determine the phase of the DQSCA and DQSCB.

[4] DQSCAThis signal is used to strobe the data from memory bank A during a READ operation, resulting in the data at port An attached to memory bank A appearing at data port Cn attached to the system bus. Note that typically n will be an integer between 0 and 7, so that eight A data ports will be included, designated as A0, A1, etc. to A7, and eight C data ports will be included, designated as C0, C1, etc. to C7.

[5] DQSA1This signal is identical to, but isolated from, DQSA.

[6] DQSCBThis signal is used to strobe the data from memory bank B during a READ operation, resulting in the data at port Bn attached to memory bank B appearing at data port Cn attached to the system bus. Note that typically n will be an integer between 0 and 7, so that eight B data ports will be included, designated as B0, B1, etc. to B7.

[7] DQSB1This signal is identical to, but isolated from, DQSB.

[8] DMAThis signal is a data mask applied to each of n ports An during a write operation. The data mask is used. in the circuitry external to the present invention during a write operation. When the mask is TRUE data is not written to the external memory connected to the port An.

[9] DMBThis signal is a data mask applied to each of n ports Bn during a write operation. The data mask is used in the circuitry external to the present invention during a write operation. When the mask is TRUE data is not written to the external memory connected to the port Bn.

[10] DQSCAThis signal is a strobe signal used to strobe data onto the system bus during a READ operation. It acts upon data originating from the A memory bank.

[11] DQSCB/MBThis port during a READ operation carries a signal as a strobe signal used to strobe data onto the system bus during a READ operation. It acts upon data originating from the B memory bank. During a WRITE operation it carries a signal which is a data mask used to generate signals DMA and DMB[12] VREF VREF is a voltage source equal to of one half the main supply voltage to the device. For example, if the main supply voltage is 2.5 volts, the VREF voltage is 1.25 volts. The VREF is distributed internally to the circuits that require more precise switching levels.

Figure 6:
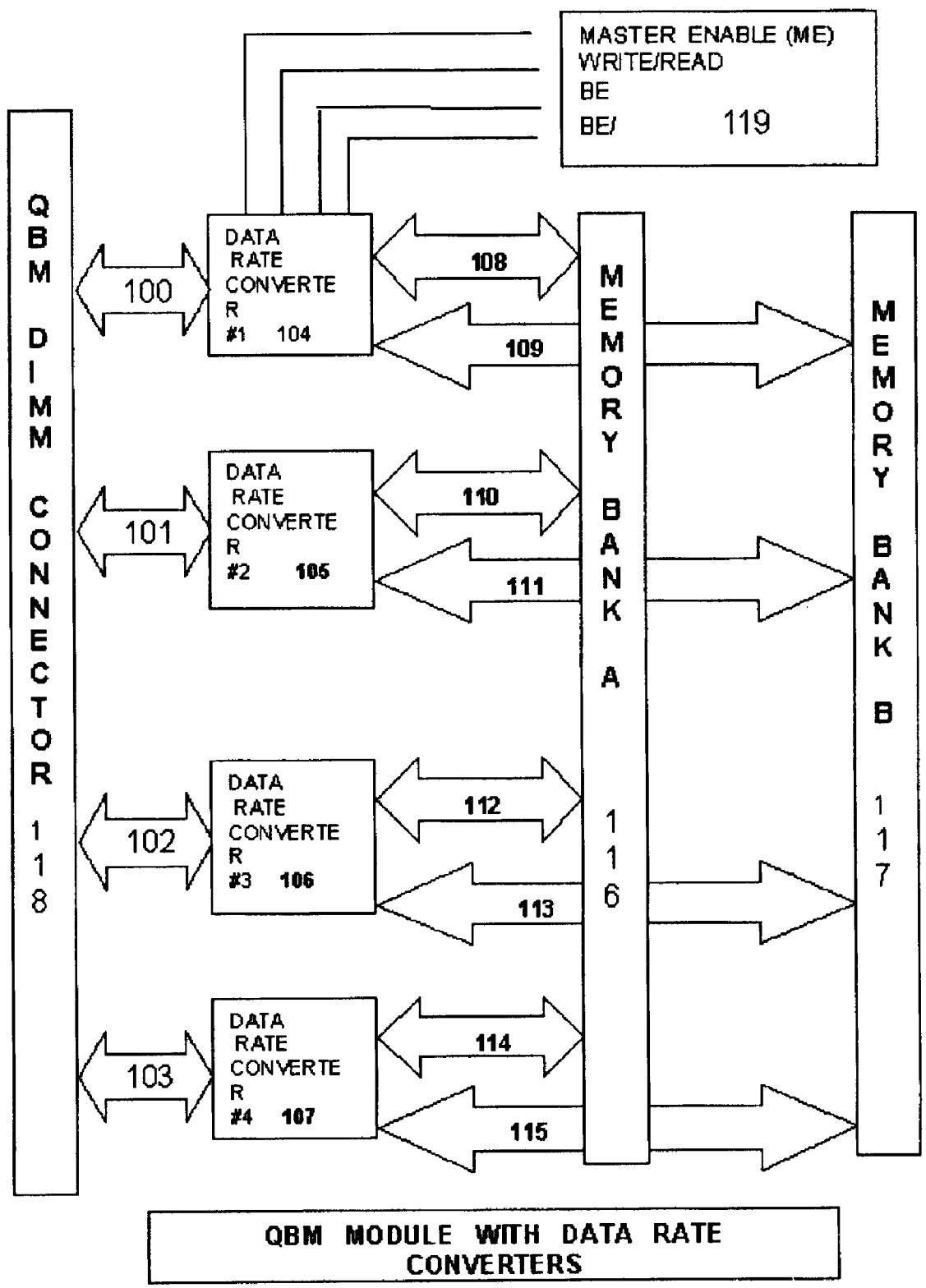
FIG. 6 depicts a two-memory-bank system utilizing the present invention as a control element.

The principle of the current invention may be understood by first referring to the block diagram of FIG. 6. Data is transferred from the data from a computer memory bus, through a DIMM connector 118 to the first data rate converter 100, to memory bank A 116 and to memory bank B 117 through paths 108 and 109 respectively, and from the memory banks back to the computer memory bus through the same paths. Each of the other three data rate converters shown in FIG. 6 use identical operations and data paths. Thus, the system of FIG. 6 allows data transfer to and from the computer memory bus at twice the speed of access to each of the memory banks. The principle underlying this transfer is described in U.S. Pat. No. 6,446,158, issued to the applicant of the current invention, and is accordance with the QBM specification promulgated by JEDEC. The disclosure of U.S. Pat. No. 6,446,158 is incorporated herein by reference for the purpose of disclosing the principle and operation of the system of FIG. 6.

The present invention has the purpose of implementing the high-speed memory system of FIG. 6 by providing a novel and non-obvious circuit element, shown in FIG. 6 as the Data Rate Converter 104, 105, 106 and 107. Each block identified as a DATA RATE CONVERTER 104, 105, 106, and 107 is an exemplar of the circuit which is the subject of the current invention described in this application. A single Master Enable Read/Write control circuit 119 serves all four DATA RATE CONVERTERS. The circuit of the DATA RATE CONVERTER is implemented in the form of a single silicon microchip, and is shown in block diagram form in FIG. 3.

It is the main function of this device to provide the conversion of the output of devices of 1× data rate frequency to a system data bus requiring a 2× data rate frequency and the reverse, conversion of 2× data rate frequency of a system bus to 1× data rate frequency required by devices comprising the memory sub-system. Furthermore, this invention provides strobe and mask signals which are synchronized to the data signals on the data banks and system bus, respectively. Although the description herein is centered around the 1× to 2× and 2× to 1× conversion, nothing prevents the concept from been applied for 1× to nx and nx to 1× conversion.

The block diagram of FIG. 1 shows the main function subsytems that are included in the device of this disclosure. Referring now to this figure, The Logic Control Block 204 uses the control signals ME (master enable), BE (blank enable) and W/R (write/read) to control the functions of the other subsystems of the device. The truth table in FIG. 2 explains the functions implemented.

Still referring to FIG. 1, the MUX & LATCH DQ Block 204 controls the transfer of the data bits DQA, DQA1, DQB, DQB1 during the Read and Write operations. This block provides a path for the DQ signals from ports An and ports Bn and their respective internal latches to pass by use of PASS gate switches, depicted in FIG. 3B, to ports Cn during a Read function, and from ports Cn during a WRITE operation.

Still referring to FIG. 1, the MUX & LATCH DQS Block 202 generates a DQSCA strobe signal for use in strobing in the data on ports Cn in phase with the DQ data derived from memory bank A during a READ operation. The frequency of the DQSCA is the same as the frequency of the BE control signal that generates it. During a Write operation, the DQSCA signal is an input clock to the device, originating from external sources. During a WRITE this signal controls the latching of the data into the internal latches of the current invention. This signal also generates the DQSA and DQSB strobe signals used to strobe and latch the data into memory ports An and Bn.

Still referring to FIG. 1, the MUX & LATCH DQS/DM Block 200 generates a DQSCB/DM strobe signal on ports Cn during a READ operation. This strobe signal is in opposite phase to the DQSCA on ports Cn and in phase with the DQ data signals on ports Cn derived from port Bn. The frequency of the DQSCB signal is the same as the frequency of the DQSCA signal, and is the same as the BE signal that generates them. During a Write operation, the DQSCB/DM signal is an input signal which produces the Data Mask (DMA and DMB) signals. These Data Mask signals are used in preventing writing the data signals to ports An and Bn.

Still referring to FIG. 1, Strobe Generating Circuitry DQS 202 produces strobe signals on port DQSA, DQSA1, DQSB, and DQSB1, all at the basic clock rate, as a result of processing input signal DQSCA derived from the computer bus. DQSA and DQSA1are directed to memory Bank A. Similarly, strobes DQSB and DQSB1, generated by DQS circuitry 202, are generated at the basic clock rate, and are directed to memory Bank B.

DQSA, DQSA1, DQSB, and DQSB1 are used only in latching data from ports DQAn and DQBn to the memory devices attached to ports DQAn and DQBn.

The paths from PU and PD are disabled by the WR/R signal when in Write mode. When in Read mode, only the PU and PD paths are active, under control of the WR/R control line and the BE (bank enable) and BE# control lines.

The DQSCA strobe signal, used to strobe the main memory bus, is at twice the basis clock frequency, and therefore twice the frequency of the DQSA, DQSA1, DQSB, DQSB1 signals.

Figure 3:
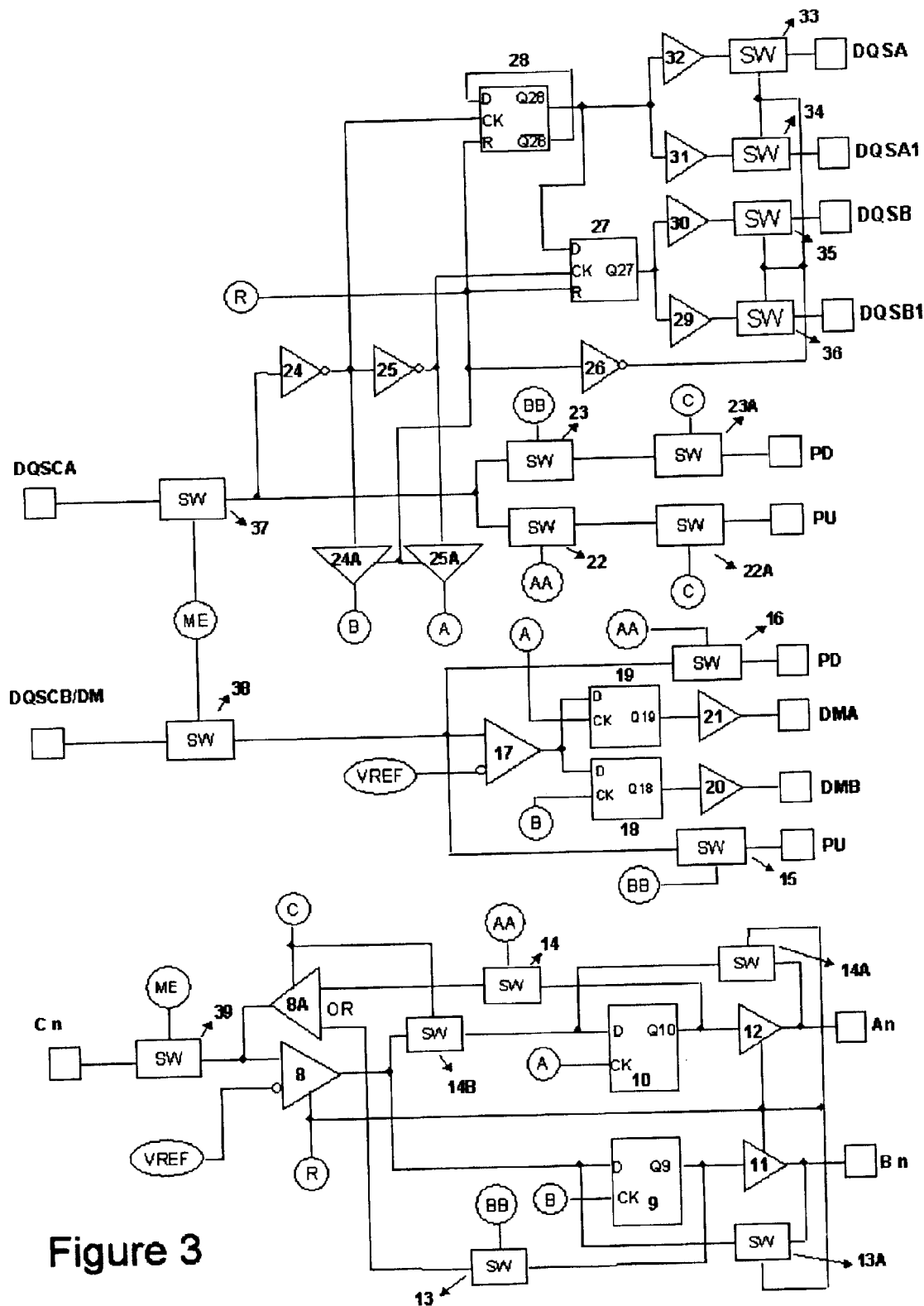
FIG. 3 depicts a schematic diagram of the main elements of the present invention.
Figure 3A:
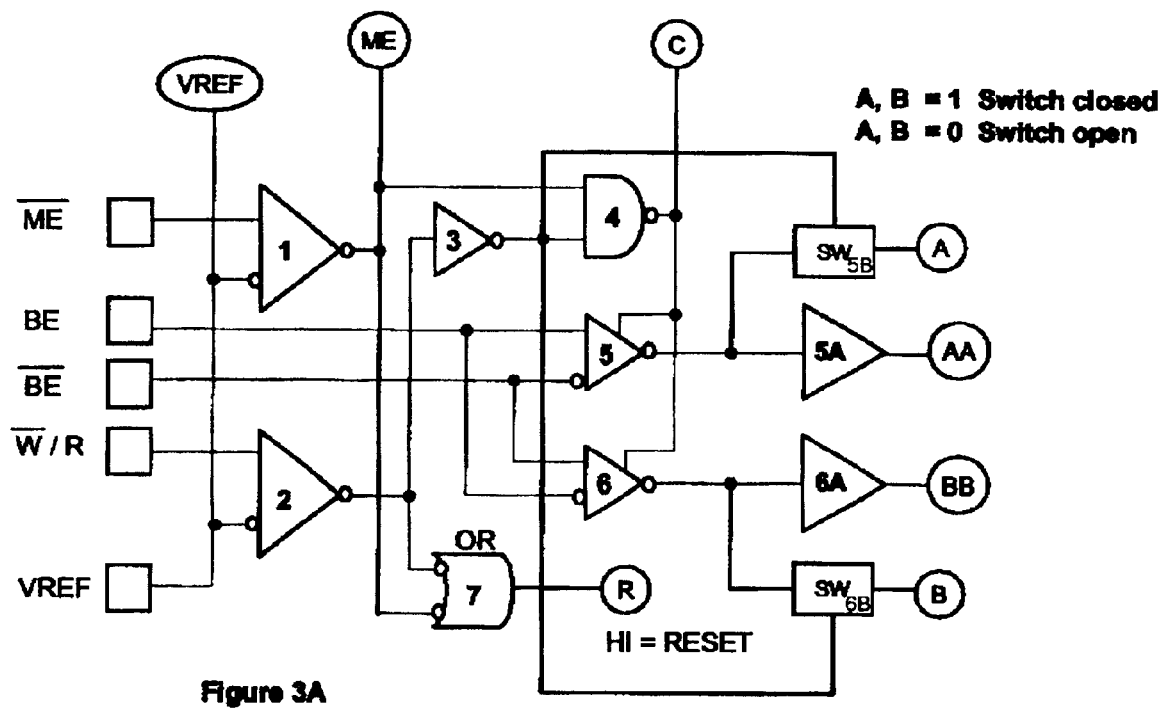
FIG. 3A depicts a schematic diagram of the control circuitry of the present invention.
Figure 3B:
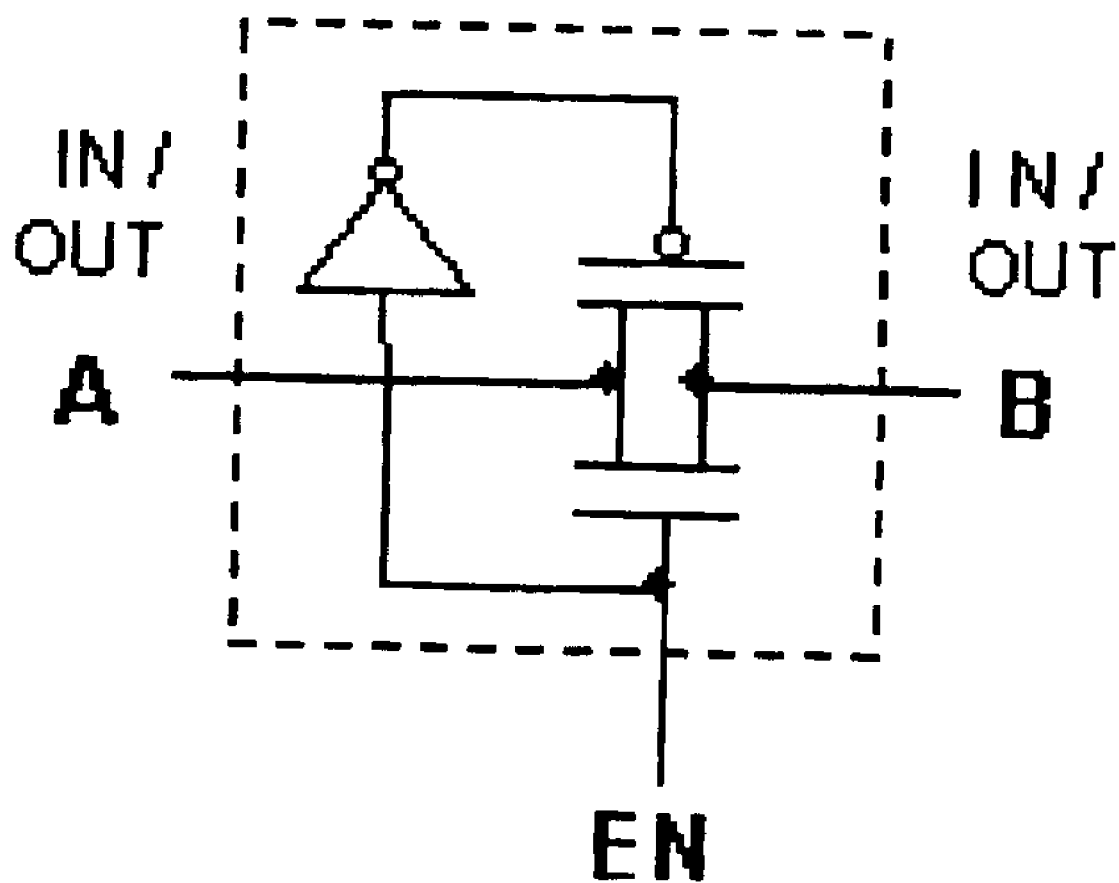
FIG. 3B depicts the internal circuitry of the pass gate used in FIG. 3 of the present invention.

Referring next to FIG. 3B, the pass gate referenced by the symbol SW in FIG. 3 is depicted. This circuit is well known in the prior art, and provides for the low-impedance connection between line IN/OUT A and IN/OUT B when the EN line is maintained in TRUE condition, and provides a very high impedance when EN is FALSE. In the following discussions IN/OUT A will also be referred to as the SOURCE, and IN/OUT B will be referred to as DRAIN, while EN will be referred to as the GATE.

Referring next to FIGS. 3A and 3B, a high-speed switching element showing the details of block 204 in FIG. 1 includes a first port Cn, a second port An, and a third port Bn, and wherein a first SW 39 in FIG. 3 source is connected to port Cn, wherein first SW 39 drain is connected to input of tri-state driver 8 and to output of tri-state driver 8A. Output of driver 8 is connected to source of SW 14B, to source of SW 13A and to data D input of latch 9. The drain of SW 14B is connected to source of SW 14 and to the data input D of latch 10. One input of the OR driver 8A is connected to the source of SW 13. A second input of OR driver 8A is connected to source of SW 14. The drain of SW 14 is connected to input of driver 12 and to the output of Q10 of latch 10. The drain of SW 13 is connected to the input of driver 11 and to the Q9 output of latch 9. The output of driver 12 is connected to port An and to the drain of SW 14A. The output of driver 11 is connected to port Bn and to the drain of SW 13A. The tri-state control of driver 8, 11, 12 and the enable control of SW 14A and SW 13A are connected to R (RESET) of FIG. 3A.

Data latch 10 and data latch 9 have data and clock inputs. The basic clock signal in this case is seen to be generated from the bank enable (BE) input. Data latch 10 is triggered by a clock of a rising phase, it is connected to output A, drain of SW 5B of FIG. 3A and output of inverter 25A of FIG. 3 and it is controlled by the rising edge of clock DQSCA through inverter 25A during a WRITE, and the BE and BE/ through driver 5 of FIG. 3A during a READ. Data latch 9 is triggered by a clock of a rising phase, it is connected to output B, drain of SW GB of FIG. 3A and output of inverter 24A of FIG. 3 and it is controlled by the falling edge of clock DQSCA through inverter 24A during a WRITE and the BE and BE/ through driver 6 of FIG. 3A during a READ. Furthermore, the enable of SW 39 is gated by the ME output of inverter 1 in FIG. 3A. The enable line of SW 13 is connected to output BB of driver 6A and the enable of SW 14 is connected to output AA of driver 5A in FIG. 3A. The tri-state control of driver 8A is connected to the enable control of SW 14B and to the point C of FIG. 3A.

Still referring to FIG. 3, a second high-speed switching element includes a first port DQSCA, a second port PU, and a third port PD.

The source of first SW 37 is connected to port DQSCA. The source of a second SW 23 is connected to the source of the second SW 22, the drain of first SW 37 and connected to the input of inverter 24. Output of inverter 24 is connected to the input of inverter 25, to the input of driver 24A, and to the clock of latch 28. Output of inverter 25 is connected to the clock of latch 27 and to the input of driver 25A. The drain of the second SW 23 is connected to source of SW 23A. The drain of SW 23A is connected to port PD. The drain of the third SW 22 is connected to source of SW 22A. The drain of SW 22A is connected to port PU. The enable of SW 23 is connected to BB output of driver 6A. The enable of SW 22 is connected to AA output of inverter 5A. The enable of SW 22A and SW 23A is connected to C output of NAND gate 4 of FIG. 3A.

Still referring to FIG. 3, a third high-speed switching element includes a first port, DQSCB/DM, a second port PD, a third port PU, a fourth port DMA and a fifth port DMB. A first SW 38 source is connected to port DQSCB/DM. A second SW 16 source is connected to first SW 38 drain, connected to source of third SW 15, connected to input of driver 17. The drain of SW 16 connected to port PD. The drain of SW 15 connected to port PU. The output of driver 17 is connected to data input of latch 18 and data input of latch 19. Data latch 18 and data latch 19 have data and clock inputs. Data latch 19 is triggered by a clock of a rising phase and is controlled by the A output drain of SW 5B 5 of FIG. 3A. Data latch 18 is triggered by a clock of rising phase and is controlled by the B output drain of SW 6B of FIG. 3A. Furthermore, data latch 18 has a Q18 output connected to driver 20 input. Driver 20 output is connected to port DMB. Data latch 19 output Q19 is connected to driver 21 input. Driver 21 output is connected to port DMA. The enable control of SW 15 is connected to BB output of inverter 6A of FIG. 3A. The enable control of SW 16 is connected to AA output of inverter 5A of FIG. 3A The VREF port is connected to drivers 8 and 17 of FIG. 3 and to drivers 1 and 2 of FIG. 3A.

Still referring to FIG. 3, a high-speed 2 bit counter element includes a first port DQSA, a second port DQSA1, a third port DQSB, a fourth port DQSB1. The source of first SW 33 is connected to output of driver 32. The drain of SW 33 is connected to port DQSA. The source of second SW 34 is connected to driver 31. The drain of SW 34 is connected to port DQSA1. The source of third SW 35 is connected to output of driver 30. The drain of SW 35 is connected to port DQSB. The source of fourth SW 36 is connected to driver output 29. The drain of SW 36 is connected to port DQSB1. The enable of SW 33 is connected to the enable of SW 34, the enable of SW 35, the enable of SW 36, and the output of inverter 26. Input of driver 32 is connected to input of driver 31, to the latch 28 output Q28, and to the data input D of latch 27. Input of driver 30 is connected to the input of driver 29, and to the output Q27 of latch 27. Output Q28 of latch 28 is connected to data input D of latch 28. The reset R of latches 27, 28 is connected to the input of driver 26, to the tri-state input of drivers 24A and 25A and to the R output of OR gate 7 of FIG. 3A.

Referring now to FIG. 3A and FIG. 3, the Logic Control Block 206 of FIG. 1 is described in detail. The circuit includes a first port BE, a second port BE not, a third port W/R, a fourth port ME, and a fifth port VREF is connected to the negative side of inverters 1 and 2. The BE port is connected to the positive side of tri-state inverter 5 and to the negative side of tri-state inverter 6. The BE NOT port is connected to the positive side of tri-state inverter 6 and to the negative side of tri-state inverter 5. Inverters 5 and 6 are of the differential input type. The tri-state control for 5 and 6 is connected to the output of NAND gate 4. Output of inverter 5 is connected to source of SW 5B and to input of driver 5A. Drain of SW 5B is connected to A for latches 10, 19, and to the output driver 25A. The output of inverter 6 is connected to source of SW 6B and input of driver 6B. Drain of SW 6B is connected to B for use by latches 9, 18 and is further connected to the output of driver 24A. Port W/R is connected to the positive side of inverter 2. The output of inverter 2 is connected to input of inverter 3 and to one negative side of OR gate 7. Port ME is connected to the positive side of inverter 1. The output of inverter 1 is connected to NAND gate 4, to one side of OR gate 7 and as the ME line connected to SW 37, 38, and 39. The output of OR gate 7 labeled R is the reset function of the device. The output of inverter 3 is connected to one input of NAND gate 4 and to then EN enable of SW 5B, SW 6B. . The output of NAND gate 4 is connected to C enable gates for SW 22A and 23A.

As previously mentioned, the SW element has an EN (Enable) control input and two ports A and B labeled each as IN/OUT. The IN/OUT indicates that the signal can flow in either direction once the SW is enabled. The proper polarity (High) at EN will create a shorted channel between A and B and allow the signal to flow through. The (Low) polarity will constrain or block the channel between A and B and will inhibit the signal flow between A and B, effectively, creating an open circuit isolating point A from point B.

All the blocks labeled SW are of the same type with different enable control signal. For the modes of the device to function properly, the ME input signal must be active LOW for the entire time that any function of the device is exercised. Logic block 1 is controlled be the ME signal.

The inactive state of the ME signal keeps the functions of the device in the RESET state. SW 37, 38, 39 isolate the internals of the device from the BUS to which the device is connected. The SW in the disconnect state presents to the BUS only a small capacitance in the order of 3 pico-farads or less. This low capacitance and the isolation feature allows the BUS to operate at high frequencies with more than one device attached to the same BUS.

Logic elements 2, 3, 4, 5, SA, SB, 6, 6A, 6B and 7 implement the control functions of the device.

Logic elements 8, 8A,9, 10, 11, 12, and SW 39, 13, 13A, 14, 14A, 14B and ports An, Bn, and Cn implement the data path DQ for both READ and WRITE functions. This is only one copy of the data bit paths implemented in the device. A multiple number of similar paths could be implemented in the same device.

Logic elements 17, 18, 19, 20, 21, and SW 38, 15 and 16 implement two functions. One function is the Data Mask (DM) function during a WRITE operation to the attached devices at DMA and DMB points. The other function is the generation of the DQSCB signal during a READ operation.

SW 37, 22, 22A, 23 and 23A implement the generation of the DQSCA signal during a READ operation. The DQSCA signal, during a WRITE operation, serves as a clock to the internal lathes. Logic elements 24 and 25 generate the proper phase for the internal clocks. Logic elements 24A and 25A serve to isolate internal feedback of the DQSCA to clocks controlled by the BE and BE/ signals.

Logic elements 26, 27, 28, 29, 30, 31, 32, 33, 34 are part of the two bit counter that generates the strobe signals for the attached devices at points DQSA, DQSA1, DQSB, DQSB1.

In the current invention, all of the switching circuit shown in the block diagram of FIG. 1 and in the detailed schematic drawings of FIGS. 3, 3A, and 3B is implemented by microelectronic techniques, and manufactured in the form of a single semiconductor chip.

An example of the use of the current invention is shown in FIG. 6, which depicts a memory module, contained on a single circuit board, used as part of a Bit Packing (BP) memory system described in the disclosure of U.S. Pat. No. 6,446,158. The module comprises Memory Bank A (116) and Memory Bank B (117), and makes the various ports, or terminals of the memory banks available to the computer bus through intermediate Data Rate Converters (104), (105), (106), and (107), each of which corresponds to the device which is the subject of the present application. In the Module of FIG. 6, the computer bus connects with the switches through a connector slot (118). The memory module depicted in this FIG. 6 is a DIMM style module, well known in the art.

The general operation of the device can be understood by again referring to FIG. 1. In this figure, the data ports DQAn and DQBn are used to access memory banks A and B of the computer memory, where n is a number between 0 and 7, thereby accessing an 8-bit byte of memory for each bank.

The DQS/DM sub-circuit 200 has a dual function: during a Write operation, it acts similarly to the DQ sub-circuit 204, providing a Data Mask DMA and DMB signal for the devices attached. During a Read, the PU and PD signals are used to produce a DQSCB/DM strobe signal to the controller. The DQSCB/DM input/output signal is at twice the basic clock frequency, and therefore twice the frequency of the DMA, DMB signals.

Still referring to FIG. 1, The DQ sub-circuit 204 has the sole function of passing the data from port DQCn to ports DQAn and DQBn during a Write operation and from DQAn and DQBn to DQCn during a Read operation. The Data Rate of the signals entering the DQAn and DQBn side is converted to twice the rate exiting port DQCn.

The Logic Control sub-circuit 206 generates the proper control signals for all of the function implemented in this device.

Referring now to the logic table FIG. 2, the conditions of the output signals are shown for the possible combinations of input signals. The value of 1 in this table indicates a TRUE state, while a 0 indicates a FALSE, and an "X" indicates that the value may be either.

When the ME (master enable) signal is TRUE, for instance, the data signal ports, indicated by C[0,7], A[0,7] and B[0,7] are all high-Z, or high impedance, and are not connected to each other. The data mask signals. DMA and DMB are FALSE, and the strobe signal ports DQSA, DQSA1, DQSB, AND DQSB1 are all high-Z, and therefore do not transfer any signals. The MODE of this condition is described as DISABLE DIMM.

When the signal at the W/R is TRUE, and the ME signal is FALSE, then the C port is connected to read the signal at either the A port or the B port, depending upon the status of the signal at the BE (bank enable) port. The mask signals at ports DMA ad DMB are FALSE, and the strobe ports DQSA, DQSA1, DQSB, AND DQSB1 are all high-Z, and therefore do not transfer any signals.

When the ME (master enable) signal is FALSE, and the W/R (read-write) signal is FALSE, then the strobe signals DQSA, DQSA1, DQSB, AND DQSB1 strobe signals may change state, or toggle, depending upon the state of the corresponding data signals.

All functions implemented by the circuitry shown in FIGS. 3 and 3A are described in truth table form in FIG. 2.

The symbolic representation of the VREF as a negative or low level at the input of logic symbols 1, 2, 8, 17 means that the VREF level is lower than the level of the other input of the logic block as the technology specifies. For example, if the input of logic symbol (1) labeled ME is at a higher level than the VREF, then the output of the block is indicated as low level signal. For logic blocks 8 and 17, the output will be High when the VREF is at a lower level than the other input of the blocks 8 and 17.

When the ME signal is TRUE (Higher level than VREF) the output of block (1) generates through block 7 a general RESET. This internal RESET keeps latches 27 and 28 in the reset state. The inversion of the RESET by block 26 disables SW 33, 34, 35,36, tri-states drivers 8, 11, 12, 24A, 25A and SW 13A and 14A. The same internal reset is also generated by block 2 and block 7 when the W/R read line is TRUE (High level) READ mode. The direct output of block 1 disables SW 37, 38, 39, and provides an internal RESET through logic block 7. It also conditions NAND gate 4. SW 39 is replicated multiple times as the application requires.

Referring again to FIGS. 3 and 3A, as well as the timing diagrams of FIGS. 4A through 4L the READ function will be described below. When ME is FALSE, (Low), it will enable SW 37, 38 and SW 39. The W/R line being TRUE, (High), (READ mode), will condition block (2) and block (3) to allow block (4) to remove the tri-state condition from inverter drivers (5) and (6). The signals BE and BE#, are the complements of each other. The transition of BE from High to low and BE# from low to High causes block (5) to generate signal A TRUE, and block (6) to generate signal B FALSE. A TRUE signal A or B clocks the respective latch with the rising phase and generate delayed signals AA and BB respectively. When the device is placed in the READ mode, drivers 8, 11, 12 are tri-stated and SW 14B is switched OFF. Driver 8A is turned ON and SW 13A and SW 14A are switched ON. Data from ports An and Bn reaches the respective data input of the latches and is latched by the respective clock A or B. Because the clocks A and B are periodic with period equal to 1/2x, the data at the output of each latch will be equal to one half period of the 1× clock. The latches serve to extend the data valid time. In the prior art the data duration at ports An and Bn are only a portion of the half period of the 1× clock that drives the memory devices attached. Since the duration of the data is reduced there is a need to recreate the data time to full width. This allows a full width portion to be sampled by switches SW 14 and SW 13 at high frequencies.

As a result SW 14 will drive driver 8B for the duration of the sampled data and then SW 13 will drive driver 8B for its duration of the sampled data. Driver 8B will drive the data onto Cn.

Figure 4:
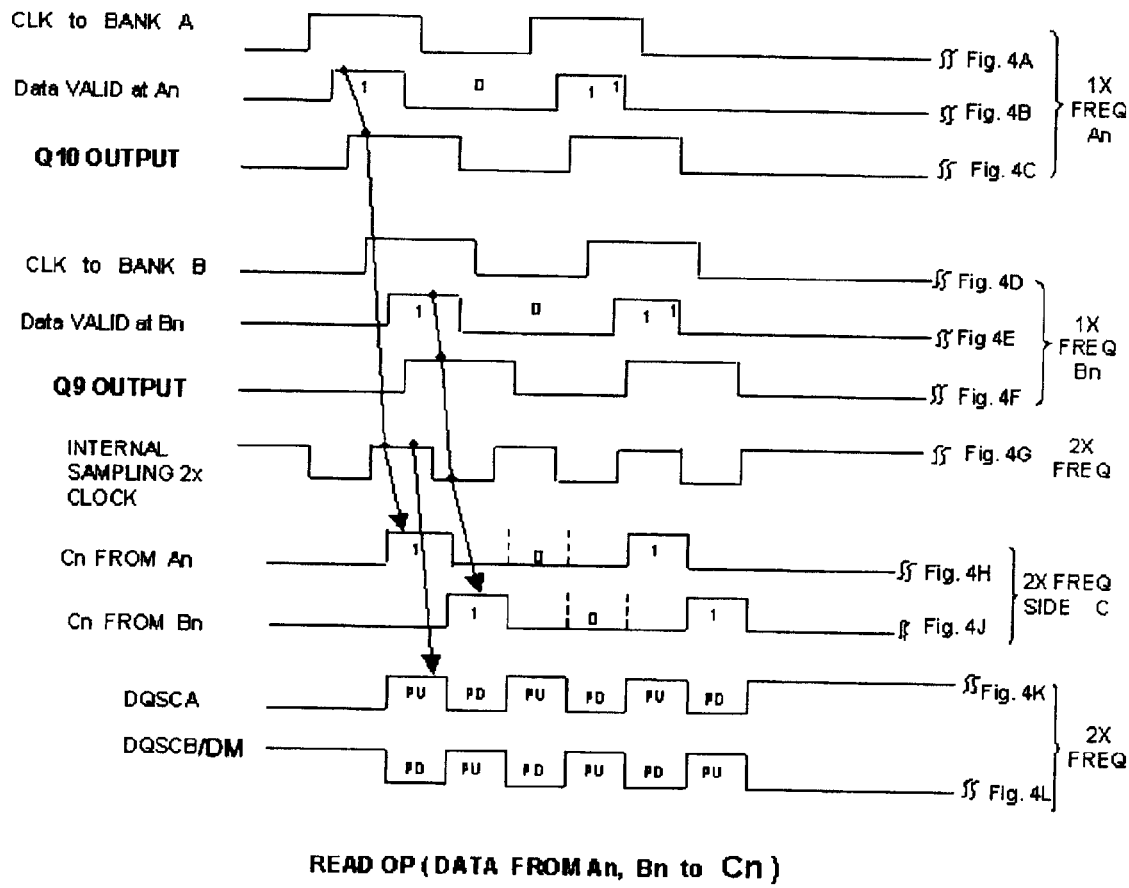
FIG. 4A depicts the signal waveform from the external clock signal during a read operation.
FIG. 4B depicts the signal waveform appearing at port An during a read operation.
FIG. 4C depicts the signal waveform appearing at ref during a read operation. Q10 during a read operation.
FIG. 4D depicts the signal waveform appearing at port DQSCB during a read operation.
FIG. 4E depicts the signal waveform appearing at port Bn during a read operation.
FIG. 4F depicts the signal waveform appearing at Q9 during a read operation.
FIG. 4G depicts the signal waveform appearing at ref AA during a read operation.
FIG. 4H depicts the signal waveform appearing at port Cn derived from port An during a read operation.
FIG. 4J depicts the signal waveform appearing at port Cn derived from port Bn during a read operation.
FIG. 4K depicts the signal waveform appearing at port DQSCA during a read operation.
FIG. 4L depicts the signal waveform appearing at port DQSCB during a read operation.

The resulting wave forms are shown in FIGS. 4A through 4L. The clock signals used by Bank A, seen in FIG. 4A, and by Bank B, as shown in FIG. 4D, are clock signals external to the circuitry of the present invention. These external clock signals are synchronized with BE and BE# in the present invention, and lag BE and BE# in phase.

The data valid signals, appearing in FIGS. 4B and 4E, and corresponding to the signal on ports An and Bn, are delayed from the clock signals due to small delays in the circuitry, and are then increased in width by the latching circuits 9 and 10, as shown in FIGS. 4C and 4F. The latching circuits will retain their state until the inputs change, and are clocked. The latched signals are further processed by ANDing with the internal sampling clock, shown in FIG. 4G, which is signal AA in FIG. 3A. The results of the ANDing is shown in FIGS. 4H and 4J, which are the components of the data signal on port Cn from each of the An port signal and Bn port signal after processing as described above.

The pulse width of signals DQSCA and DQSCB is equal to the pulse width of the signals at ports BE and BE#. SW 23 will allow the PU level (VCC) to travel through SW 37 to port DQSCA, as shown in FIG. 4K. SW 16 will allow the PD level (GND) to flow through SW 38 to port DQSCB/DM, as shown in FIG. 4L. It is clear that the data rate at ports Cn, DQSCA and DQSCB/DM is twice that of ports An and Bn, and is equal to the frequency of the BE and BE# signals. The DQSCA and DQSCB/DM signals thus generated are used to strobe the data of the Cn port during READ operations.

Figure 5:
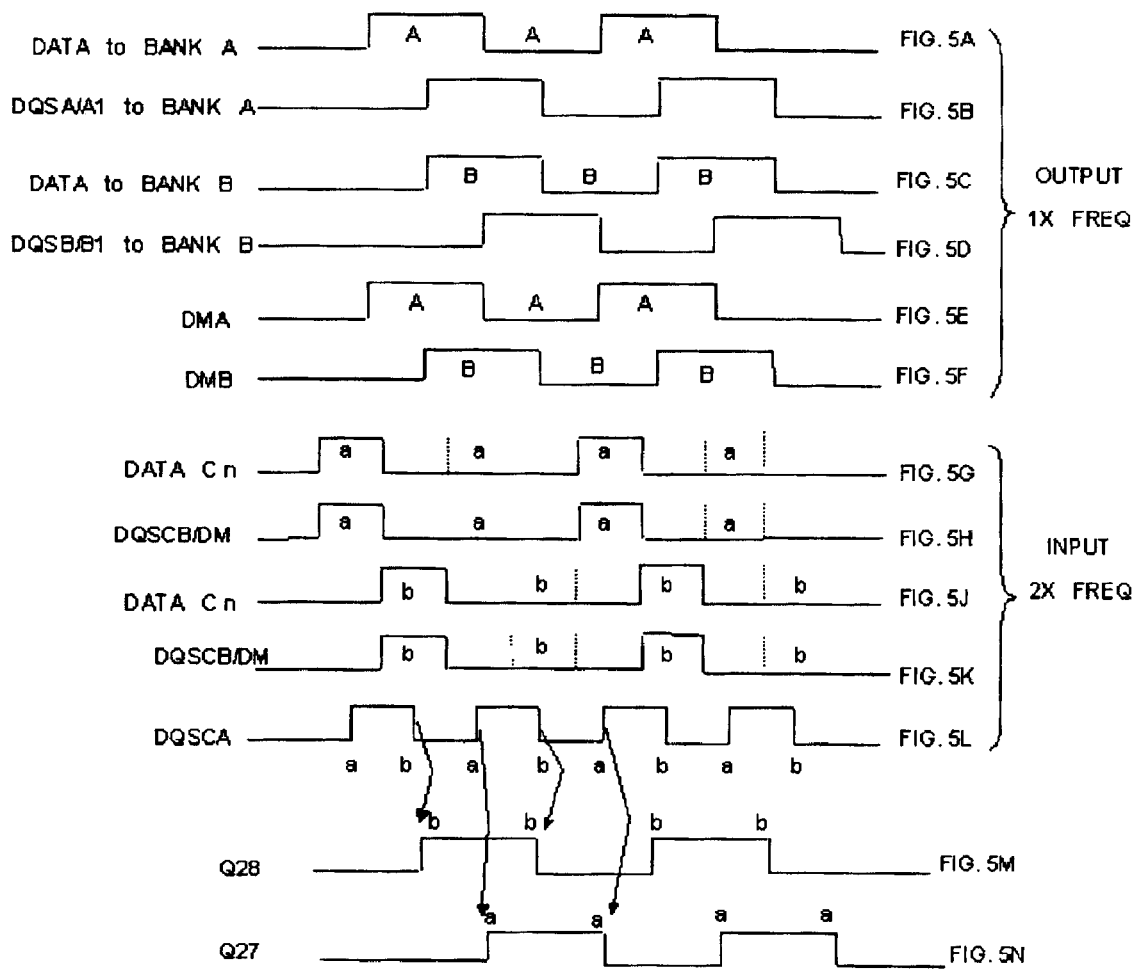
FIG. 5A depicts the signal waveform appearing at Port An during a write operation.
FIG. 5B depicts the signal waveform appearing at Port DQSA/A1 during a write operation.
FIG. 5C depicts the signal waveform appearing at Port BN during a write operation.
FIG. 5D depicts the signal waveform appearing at Port DQS/B1 during a write operation.
FIG. 5E depicts the signal waveform appearing at Port DMA during a write operation.
FIG. 5F depicts the signal waveform appearing at Port DMB during a write operation.
FIG. 5G depicts the signal waveform appearing at Port Cn derived from port An during a write operation.
FIG. 5H depicts the signal waveform appearing at Port DQSCA/DM during a write operation.
FIG. 5J depicts the signal waveform appearing at Port Port Cn derived from port Bn during a write operation.
FIG. 5K depicts the signal waveform appearing at Port DQSCB/BM during a write operation.
FIG. 5L depicts the signal waveform appearing at Port DQSCA during a write operation.
FIG. 5M depicts the signal waveform appearing at ref. No. Q28 during a write operation.
FIG. 5N depicts the signal waveform appearing at ref. No. Q27 during a write operation.

Referring next to FIGS. 3, 3A, and 5 the WRITE function will be described. Referring first to FIG. 3A, when ME is FALSE, (Low), it will enable SW switches 37, 38 and 39. The W/R line being FALSE, (Low), which commands WRITE mode, will result in conditioning block (2) to remove the internal RESET and block (3) disables SW 5B, SW 6B and conditions block (4) to apply the tri-state condition to inverter drivers (5) and (6). Internal pull-downs make A and B signals FALSE. SW 13, 13A, 14, 14A, 15, 16, 22, and 23 are put to the OFF state and SW 14B to the ON state. Removal of RESET causes SW 33, 34, 35, 36 and drivers 11, 12, 24A and 25A to be enabled.

The clock used by the device in WRITE mode is the DQSCA signal, generated by circuitry external to the present invention, and shown in FIG. 5L. Since SW switch 37 is enabled, the DQSCA will generate the proper phase clocks for latches 9, 10, 18, 19, 27 and 28 through inverters 24 and 25. The DM (data mask) signal at DQSCB/DM is shown in FIGS. 5H and 5K as the contribution intended for the An port and Bn port, respectively. These signals are identical to the data signals themselves. The actual signal on the Cn port during a write is the sum or OR function, of the signals shown in FIGS. 5H and 5K. The rising edge (a) of DQSCA clock will latch data labeled (a) into latches Q10 and Q19. The output of these latches is shown in FIGS. 5A and 5E.

The falling edge of DQSCA (b) will latch data labeled (b) into latches 9 and 18. The output of these latches is shown in FIGS. 5C and 5F. It is seen that this process causes the data to bank B is offset one quarter cycle from the data to bank A FIG. 5B depicts the strobe signals used to latch data A into devices attached on port An. FIG. 5D depicts the strobe to latch data B into devices attached on port Bn. FIG. 5M, the output of latch 28, is seen to be synchronous with the signal at ports DQSA/SA1, a shown in FIG. 5B. Similarly, the data shown in FIG. 5N, the output of latch 27, is synchronous with the signal at ports DQSB/SB1, shown in FIG. 5D. The outputs of these latches are amplified and written into ports An and Bn, respectively.

When the RESET signal is removed, Q27, and Q28 are FALSE, (Low), and Q28# is TRUE, (High). The first rising edge (a) of DQSCA clocks latch 27. At this time the D input to the latch 27 is FALSE, (Low)=Q28. Thus, Latch 27 cannot be set and Q27 is FALSE (Low). The falling edge (b) of DQSCA will clock Q28# (High) level into latch 28 and Q28 will be TRUE, (High), as shown in FIG. 5M. The next rising edge (a) will latch Q28 output into latch 27, as shown in FIG. 5N. The signals DQSA/A1 shown in FIG. 5B and DQSB/B1, shown in FIG. 5D, align strobes for data A and B midway through their valid time.

While the invention has been described with reference to specific embodiments, it will be apparent that improvements and modifications may be made within the purview of the invention without departing from the scope of the invention defined in the appended claims.

What is claimed is:

1. A high speed data rate converting and switching circuit for use in computer memory systems comprising n memory banks, and further comprising a first external clock having a first frequency and a second external clock having a second frequency equal to n times the first frequency, the circuit comprising:

(a) a data MUX and latch subsystem which transfers each of a multiplicity of system bus data signals having the second frequency to a memory bank data signal having the first frequency during a write operation, and which transfers each of a multiplicity of memory bank data signals having the first frequency to a system data bus data signal having the second frequency during a read operation;

(b) A strobe MUX and latch subsystem which generates a memory bank strobe signal having the first frequency, and which is synchronized to the memory bank data signals with a 90 degree phase shift during the write operation, and which generates a system bus strobe signal having the second frequency which is synchronized to, and in phase with, the system bus data signals during the read operation;

(c) a mask MUX and latch subsystem which generates a memory bank mask signal having the first frequency, and is synchronized to the memory bank data signals during the write operation.

2. The high speed data rate converting and switching circuit of claim 1, further comprising:

(a) a multiplicity of latching circuits which increase the duration of each data bit during both the read and the write operation;

(b) means to generate an internal clock signal at the second frequency; and (c) means to AND the internal clock signal with the output of each latching circuit, so that the system bus data signal is at the second frequency.

3. The high speed data rate converting and switching circuit of claim 2, further comprising means to AND the first signal with the output of each latching circuit during the read operation, so that the memory data bank signal is synchronized with the first external clock.

4. The high speed data rate converting and switching circuit of claim 3, wherein the means to generate the internal clock signal at the second frequency further comprises an m-bit counter.

5. The high speed data rate converting and switching circuit of claim 4, further comprising generating system strobe signals by ANDing a pull-up signal with the internal clock, and by ANDing a pull-down signal with the internal clock during the read operation.

6. The high speed data rate converting and switching circuit of claim 5, wherein the internal clock generation circuit further provides a circuit which is triggered by the falling edge of the second external clock.

7. The high speed data rate converting and switching circuit of claim 6, further comprising means to output data to the memory banks by latching the latching circuits by the rising and falling edges of the second external clock during a write operation.

8. The high speed data rate converting and switching circuit of claim 7, further comprising means to produce a system bus strobe signal triggered by the rising edge of the second external clock during a write operation.

9. A method for high speed data rate converting and switching for use in computer memory systems comprising n memory banks, and further comprising a first external clock having a first frequency and a second external clock having a second frequency equal to n times the first frequency, the method comprising the steps of:

(d) Transferring each of a multiplicity of system bus data signals having the second frequency to a memory bank data signal having the first frequency during a write operation, and transfer each of a multiplicity of memory bank data signals having the first frequency to a system data bus data signal having the second frequency during a read operation in a data MUX and latch subsystem (e) Generating a memory bank strobe signal having the first frequency, and which is synchronized to the memory bank data signals with a 90 degree phase shift during the write operation, generating a system bus strobe signal having the second frequency which is synchronized to, and in phase with, the system bus data signals during the read operation in a strobe MUX and latch subsystem:

(f) generating a memory bank mask signal having the first frequency, and is synchronized to the memory bank data signals during the write operation in a mask MUX and latch subsystem.

10. The method of claim 9, further comprising:

(a) increasing the duration of each data bit during both the read and the write operation by means of a multiplicity of latching circuits;

(b) generating an internal clock signal at the second frequency; and (c) ANDing the internal clock signal with the output of each latching circuit, so that the system bus data signal is at the second frequency.

11. The method of claim 10, further comprising ANDing the first signal with the output of each latching circuit during the read operation, so that the memory data bank signal is synchronized with the first external clock.

12. The method of claim 11, wherein the generating of the internal clock signal at the second frequency further comprises using an m-bit counter.

13. The method of claim 12, further comprising generating system strobe signals by ANDing a pull-up signal with the internal clock, and by ANDing a pull-down signal with the internal clock during the read operation.

14. The method of claim 13, wherein the internal clock generating is accomplished by triggered by the falling edge of the second external clock.

15. The method of claim 14, further comprising latching the latching circuits by the rising and falling edges of the second external clock during a write operation to output memory bank data signals.

16. The method of claim 15, further comprising producing a system bus strobe signal triggered by the rising edge of the second external clock during a write operation.

* * * * *